Feb. 21, 1950 L. G. SIMJIAN 2,498,139
GLASS-PANEL ATTACHING DEVICE
Filed April 3, 1947 2 Sheets-Sheet 1
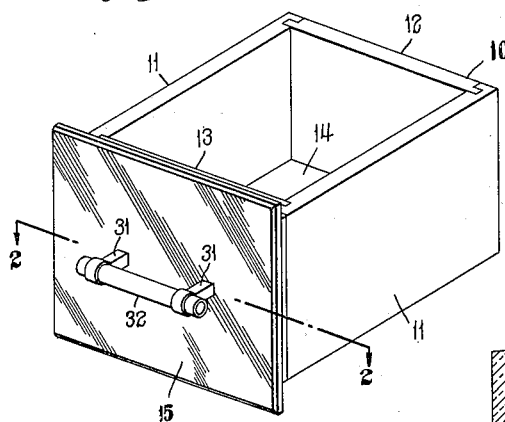
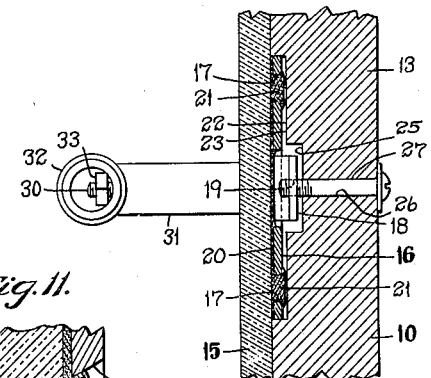
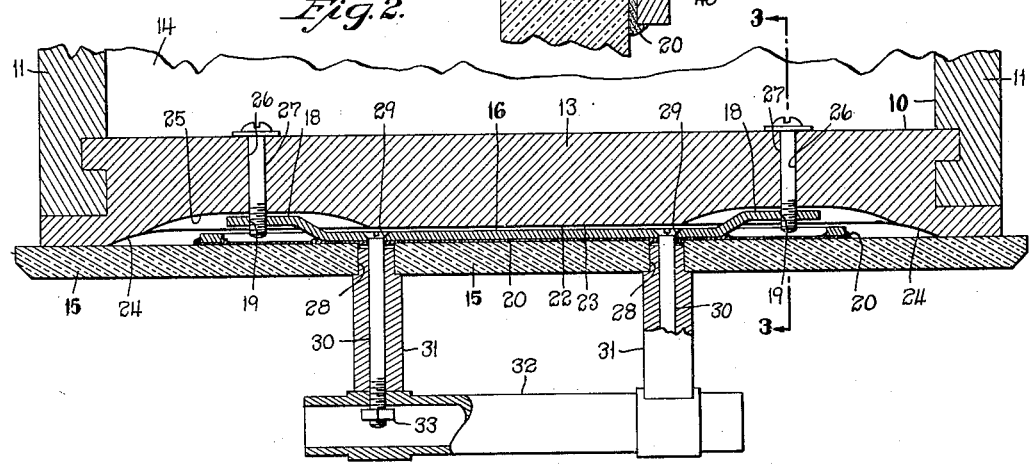
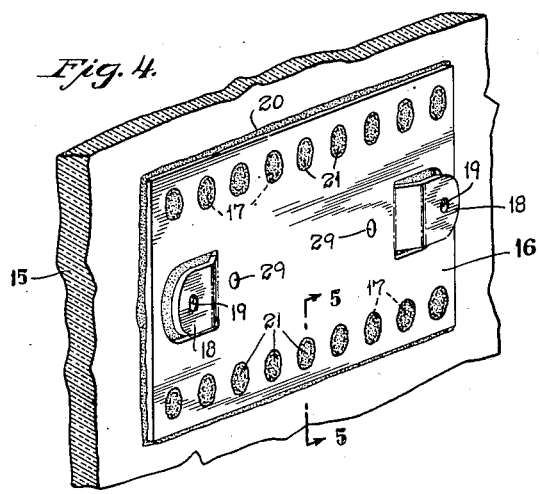
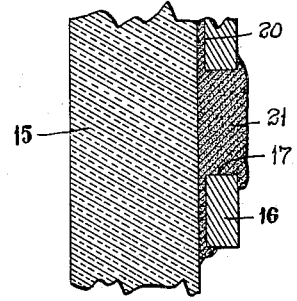
Inventor
Luther G. Simjian
By Seymour, Earle & Nichols
Attorneys Feb. 21, 1950          L. G. SIMJIAN          2,498,139
GLASS-PANEL ATTACHING DEVICE
Filed April 3, 1947          2 Sheets-Sheet 2
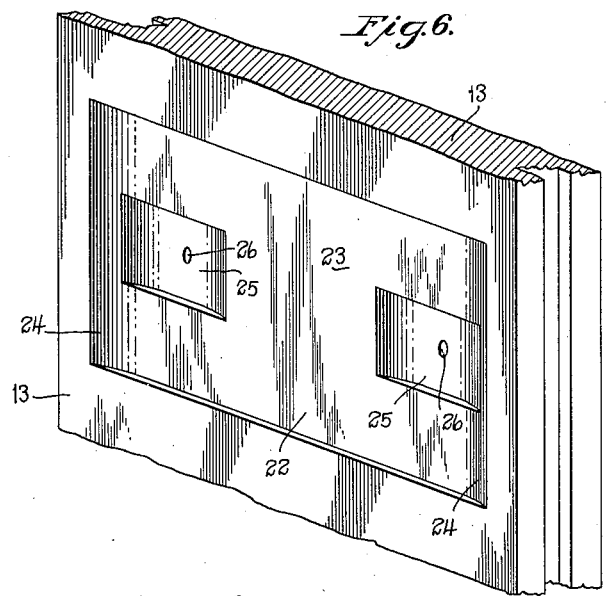
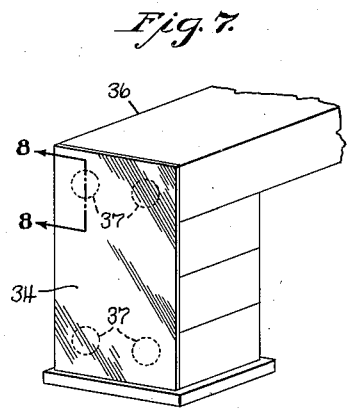
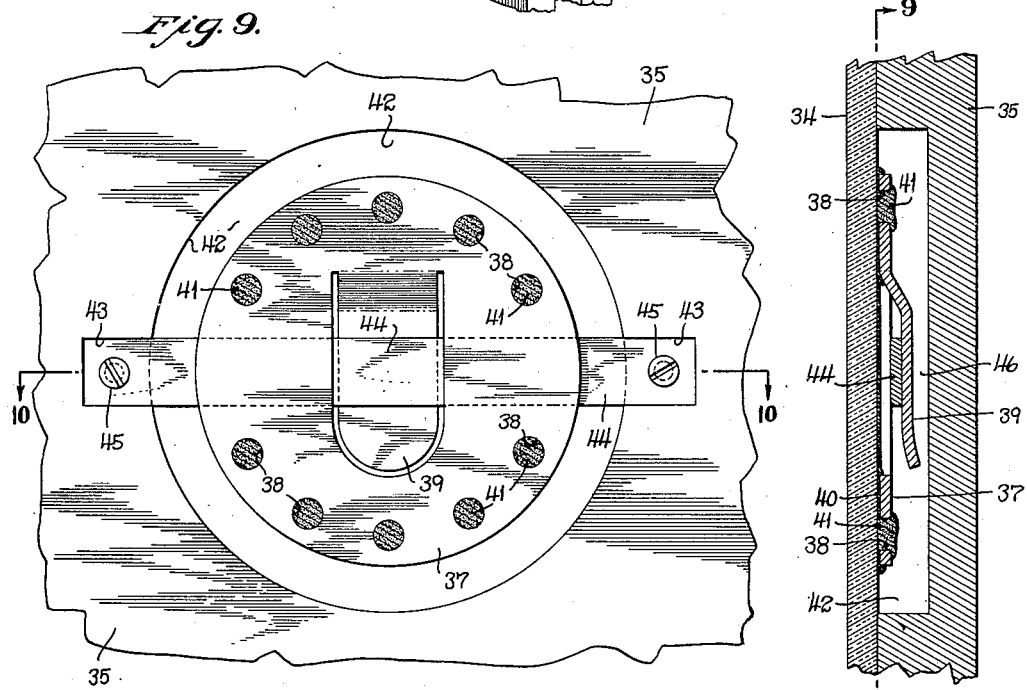
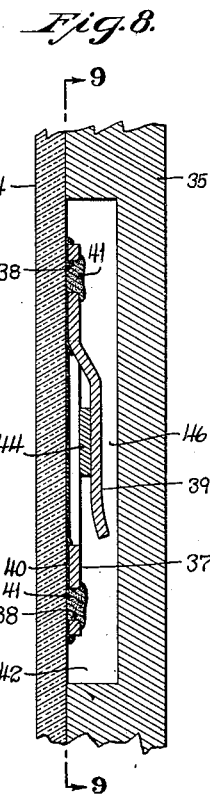
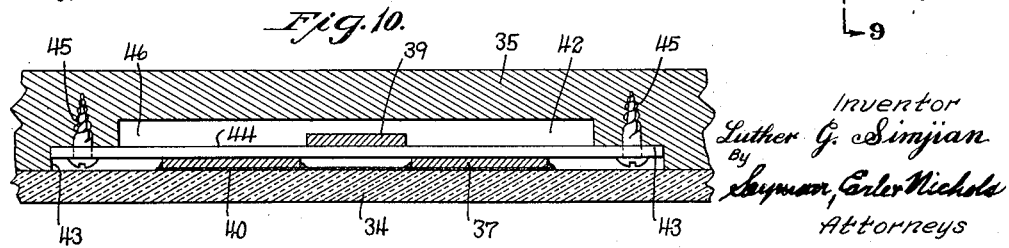
Inventor
Luther G. Simjian
By
Seymour, Carter Nichols
Attorneys Patented Feb. 21, 1950

2,498,139

UNITED STATES PATENT OFFICE 2,498,139

GLASS PANEL ATTACHING DEVICE

Luther G. Simjian, Riverside, Conn., assignor to The Reflectone Corporation, Stamford, Conn., a corporation of Connecticut Application April 3, 1947, Serial No. 739,087

5 Claims. (Cl. 88—92)

1

The present invention relates in general to fastening-means for mounting frangible ornamental panels on a supporting-surface and more particularly to improved fastening-means for detachably securing a glass-panel mirror or the like to a supporting-surface in such a way that the panels will lie flat against the supporting-surface.

An object of the invention is to provide improved fastening-means for securing a frangible ornamental panel substantially flat against a supporting-surface wherein the fastening-means is concealed by the ornamental panel.

A further object of the invention is to provide superior fastening-means for securing a mirror or glass panel substantially flat against the supporting-surface of an article of furniture, wherein the fastening-means is so constructed as to enable the mirror or glass panel to be readily attached to or detached from its supporting-surface.

A still further object of the invention is to provide superior fastening-means for detachably securing an unframed mirror or glass panel flat against the surface of an article of furniture, wherein no apertures are required in the mirror or glass panel for the fastening-means, the latter being wholly concealed by the panel.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a perspective view of a drawer, the front panel of which is provided with a mirror attached thereto by the improved fastening-means of this invention;

Fig. 2 is an enlarged fragmentary plan view in section on line 2—2 of Fig. 1 showing details of the improved fastening-means of this invention;

Fig. 3 is a fragmentary sectional end elevation on line 3—3 of Fig. 2;

Fig. 4 is a fragmentary perspective view of the back of a mirror having an element of the improved fastening-means of this invention mounted thereon;

Fig. 5 is a fragmentary end elevation in section of the plate, mirror and cement joint therebetween on line 5—5 of Fig. 4;

Fig. 6 is a fragmentary perspective view of the front panel of the drawer provided with recesses

2 to receive the fastening-means shown in Fig. 4;

Fig. 7 is a fragmentary perspective view of a desk or similar article of furniture having a glass panel mounted at one end thereof by the modified fastening-means of this invention;

Fig. 8 is an enlarged fragmentary sectional elevation of the modified fastening-means of this invention on line 8—8 of Fig. 7;

Fig. 9 is a front elevation of one of the modified fastening-means on line 9—9 of Fig. 8;

Fig. 10 is a fragmentary plan elevation on section line 10—10 of Fig. 9; and

Fig. 11 is a fragmentary end elevation in section of the plate, mirror and cement joint therebetween showing a modification of one of the apertures in the plate and the cement lug formed therein.

In the manufacture of mirrored- or glass-paneled furniture, it is the current practice, generally speaking, to secure the mirror or glass panel to the article of furniture by one of two methods, namely, by forming bolt-holes in the frangible panel and securing the panel to a supporting-surface of the article of furniture by bolts or equivalent fastening-means; or by cementing the frangible panel to a surface of the article of furniture. Both of these methods have been expensive and impracticable due to excessive breakage caused by the pressure of the bolt-heads bearing against the frangible panel, and the hazards which accompany shipment of furniture having glass panels mounted thereon as a permanent part thereof.

The present invention relates particularly to improved fastening-means for detachably mounting glass panels to articles of furniture in order that the glass panels may be detached therefrom and shipped separately in suitable wrappings so as to preclude breakage. It will be understood, however, that the invention may have other applications.

In carrying out the invention, the article of furniture which has been chosen for the purposes of illustration comprises a drawer indicated generally at 10 in Fig. 1 having the usual sides 11, back panel 12, front panel 13 and bottom 14, the sides 11 and bottom 14 being secured to the front panel 13 by means of the usual tongue- and mortise-joints. The front panel 13 of the drawer constitutes the supporting-surface on which a mirror or glass panel, hereinafter referred to as a "frangible" panel 15, is adapted to be mounted. It will be understood, however, that the term "supporting-surface," as used below and in the claims, includes all other panels of an article of furniture or of any other device or fabricated structure on which a frangible panel is to be mounted. The frangible panel is preferably an unframed mirror or glass panel, the vertical and transverse dimensions of which may be, and preferably are, somewhat greater than the corresponding dimensions of the drawer panel 13 so as to provide the usual flanges at the sides and at the bottom and top respectively of the front panel 13 of the drawer.

The unframed frangible panel 15 is adapted to be fastened securely to the front face of the drawer panel 13 by the improved fastening-means of this invention. Referring to Figs. 2, 3 and 4, one embodiment of the fastening-means comprises a metal plate 16 which is substantially rectangular in shape and of sufficient thickness to be substantially rigid. The plate 16 is somewhat shorter than the transverse dimension of the drawer panel 13, while the vertical dimension of the plane 16 may approximate one-third that of the drawer panel. The plate 16 is provided with a plurality of cylindrical apertures 17 which are drilled therethrough along both upper and lower longitudinal edges thereof, for the purpose hereinafter described. In addition to the apertures 17, the plate 16 is provided with a pair of rearwardly-projecting substantially-tongue-shaped brackets 18, each of which is formed adjacent opposite ends respectively of the plate, the face of each bracket lying in a common plane parallel to and spaced rearwardly from the rear face of the plate 16. The brackets 18 are preferably formed integrally with the plate 16 by suitable stamping operations or the brackets may comprise separate tongue-shaped elements secured to the back face of the plate by a welded joint or equivalent fastening-means, each bracket 18 being provided with an aperture 19 having internal screw threads.

The plate 16 is adapted to be rigidly secured to the back of the frangible panel 15 by a suitable cement 20 which is coated on the front face of the plate 16 in sufficient quantity to exude through the apertures 17 of the plate onto the back side thereof when the plate is pressed firmly against the panel, so as to provide cement-lugs 21 each flanged over the edge of its respective aperture 17 on the back side of the plate 16, as shown clearly in Fig. 5, for effectively anchoring the plate to the rear face of the frangible panel 15.

To mount the panel 15 and its plate 16 to the front face of the drawer panel 13, the front face of the latter is adapted to be provided with a longitudinal recess 22 which extends substantially throughout a major portion of the width of the panel 13 (see Fig. 6), the vertical dimension of the recess 22 corresponding substantially to the vertical dimension of the plate 16. The recess 22 is substantially rectangular and provided with a flat bottom 23, the opposite ends of which comprise substantially-cylindrical surfaces of revolution 24 adapted to intersect the front face of the panel 13. Moreover, the bottom 23 of the recess 21 is provided with a pair of transversely-spaced counter-recesses 25, each of which corresponds in shape substantially to the shape of the brackets 18 and is of slightly greater over-all dimensions so as to readily accommodate the respective brackets, as indicated in Figs. 2 and 3, the depth of the respective counter-recesses 25 being such that the brackets 18 will not engage the bottoms thereof in a manner such as to prevent the frangible panel 15 from seating flatly against the front face of the drawer panel 13. Formed substantially in the geometrical center of each counter-recess 25 is an aperture 26 which is drilled or otherwise formed through the drawer panel 13 to the back face thereof.

The mirror 15 and its plate 16 are assembled on the front face of the drawer panel 13 by engaging the plate 16 in the transverse recess 22 of the panel 13, the brackets 18 which project rearwardly from the rear face of the plate 16 being adapted to engage in the counter-recesses 25 of the recess 22. A pair of screws 27 are then adapted to be inserted from the rear face of the drawer panel 13 through the apertures 26 into engagement with the threaded apertures 19 of the brackets 18. By turning up the screws 27, the mirror 15 is adapted to be drawn flat against the front face of the drawer panel 13 and to be firmly secured thereto. By loosening and removing the screws 27, the mirror 15 may be readily detached from the drawer panel.

If it is desirable to provide a handle on the front face of the frangible panel 15, then the latter may be provided with a pair of laterally-spaced apertures 28 which are arranged in axial alignment with corresponding laterally-spaced apertures 29 in the plate 16. A screw 30 is adapted to be inserted through each pair of axially-aligned apertures 28 and 29 from the back side of the plate 16, the forward end of the screw 30 being adapted to extend forwardly of the front face of the frangible panel and to support a post 31 thereon. The latter, in turn, is adapted to support one end of a handle 32 which is preferably hollow and secured thereto by a nut 33 (see Figs. 2 and 3) which is mounted within the hollow handle in engagement with the bolt 29, the forward extremity of the latter being adapted to project into the hollow handle through an aperture in the wall thereof.

From the foregoing description it will be readily apparent that the frangible panel 15 is adapted to be readily assembled on or removed from the drawer panel 13 by means of the two screws 27, as a consequence of which the frangible panel may be specially wrapped and shipped separately from the drawer itself so as to prevent breakage, the frangible panel 15 being easily assembled on the front panel of the drawer after the latter has arrived at its destination. The hazards and expense incurred in shipping articles of furniture having glass-paneled surfaces as a permanent part thereof are thereby eliminated.

A modification of the fastening-means for securing a frangible panel to an article of furniture is shown in Figs. 7 through 10. In Fig. 7, the frangible panel comprises a relatively-large sheet of glass 34 which may be a mirror and which covers substantially the entire end panel 35 of a desk 36 or similar article of furniture, the glass panel being unframed and adapted to be held securely and flat against the end panel 35 of the desk. To this end, the back face of the glass panel is provided with a plurality of plates 37, each of which is substantially disk-shaped and provided around its periphery with a plurality of apertures 38. Stamped or otherwise formed from the center of each plate 37 is an integral rearwardly-projecting substantially-tongue-shaped bracket 39. Each bracket 39 is relatively resilient and its front face is arranged to lie in a plane parallel to and spaced rearwardly from the rear face of its respective plate 37 by a distance which is slightly greater than the thickness of the supporting-straps hereinafter described. Each plate 37 is adapted to be secured to the rear face of the glass panel by a suitable cement 40 which is coated on the front face of the plate and in sufficient quantity to exude through the peripheral apertures 38 onto the back face of the plate, so as to form cement-lugs 41, each of which is flanged over the edge of its respective aperture 38 on the back face of the plate 37 for effectively anchoring the plate to the rear face of the glass panel. In the embodiment shown, four plates 37 are secured to the glass panel at the respective four corners thereof, but it will be understood that more or fewer than four plates may be used and that the plates may be oriented in any chosen manner. However, it is requisite that for mounting the glass panel on the end panel of a desk, each plate shall be oriented with respect to every other plate so that the respective resilient brackets 39 extend longitudinally of the glass panel, the free ends of the brackets projecting downwardly for the purpose hereinafter described.

To mount the glass panel on the end panel 35 of a desk or similar article of furniture, the end panel 35 is provided with suitable recesses 42 which are substantially circular, the diameter of each recess being somewhat greater than the diameter of the respective plates 37, whereby the latter may be readily assembled therein. Moreover, the depth of each recess 42 is such that when the glass panel is placed flat against the end panel 35 of the desk, the bracket 39 of each plate may project into its respective recess 42 without engaging the bottom thereof, thereby insuring engagement of the rear face of the glass panel flat against the end wall of the desk. Further, the peripheral edge of each recess 42 is provided at diametrically-opposite points thereof with substantially-rectangular indentations 43, each of which is adapted to form the seat for one end of a longitudinal supporting-strap 44, which is substantially rectangular in cross section and adapted to span the recess 42, the opposite end of each supporting-strap being fixedly secured by a screw 45 in its respective indentation 43. The depth of each indentation 43 is substantially equal to the combined thickness of the supporting-strap 44 and the plate 37 so that the front face of each supporting-strap 44 will be below the face of the end panel 35, the rear face of each strap being spaced forwardly of the bottom of its respective circular recess 42 to provide a clearance-space 46 therebetween as clearly shown in Fig. 10.

In mounting the glass panel 34 on the end wall 35 of the desk, the glass panel is held against the end panel 35 with the downwardly-projecting free ends of the brackets 39 immediately above the transverse supporting-straps 44. Since each bracket is spaced rearwardly of the rear face of its respective plate a distance somewhat greater than the thickness of each supporting-strap 44, the free end of each resilient bracket is adapted to be sprung behind its respective strap 44 and to engage in the clearance-recess 46 at the rear thereof. Consequently, as the glass is moved downwardly and inwardly against the end panel 35, the brackets 39 engage over their respective supporting-straps 44 to securely lock the glass panel flat against the end panel 35 of the desk. Removal of the glass panel may be readily accomplished by pulling upwardly on the glass panel so as to disengage its brackets from the supporting-straps in the end panel of the desk. Although the formation of substantially-cylindrical cement lugs 21 in the respective plates 16 and 37 constitutes satisfactory means for adjoining the respective plates to the respective glass panels, a modification of the cement-lug construction is illustrated in Fig. 11 wherein the function of the locking-flanges which characterize the cement lugs 21 is performed by providing conically-shaped apertures 47 in the plates that is to say apertures which in cross section comprise substantially truncated conical surfaces. Thus when a plate 48 having conical apertures 47 therein is coated with cement 30 and pressed firmly against the back face of a mirror or glass panel 15, the cement will exude into the conical apertures 47 and form substantially-wedge-shaped cement lugs 49 which will positively resist separation of the plate 48 from the rear face of the mirror 15. This modification is particularly adapted for use with plates which are relatively thick and where it is undesirable to form a cement flange around the edge of the aperture at the back face of the plate.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A transportable article of furniture, including in combination: a substantially-flat exterior surface having a clearance-recess therein of less over-all dimensions than the corresponding dimensions of the said exterior surface and arranged to accommodate fastening-means; a frangible ornamental member corresponding substantially in size to the exterior surface of said article of furniture; and fastening-means arranged to detachably secure said frangible ornamental member substantially flat against the exterior recessed surface of said transportable article of furniture, said fastening-means comprising a rigid plate cemented permanently to the rear face of said frangible ornamental member and of less over-all dimensions than the corresponding dimensions of said clearance-recess so as to extend therein, and a fastening-element supported so as to extend within the clearance-recess of said exterior surface and arranged to engage and disengage the said rigid plate on the rear face of said frangible ornamental member whereby said frangible ornamental member may be readily secured to and detached from the exterior surface of the transportable article of furniture.

2. A transportable article of furniture, including in combination: a substantially-flat exterior surface having a clearance-recess therein of less over-all dimensions than the corresponding dimensions of the said exterior surface and provided with a counter-clearance recess, said clearance-recess and said counter-clearance recess being arranged to accommodate fastening-means; a frangible ornamental member corresponding in size substantially to the exterior surface of said article of furniture; and fastening-means arranged to detachably secure said frangible ornamental member substantially flat against the said exterior recessed surface of said transportable article of furniture, said fastening-means comprising a rigid plate cemented permanently to the rear face of said frangible ornamental member and of less over-all dimensions than the corresponding dimensions of said clearance-recess so as to extend therein, a tongue projecting rearwardly from the rear face of said rigid plate into the counter-clearance recess of said exterior surface, and a fastening-element supported so as to extend within the counter-clearance recess of said exterior surface and arranged to engage and disengage the tongue of said rigid plate on the rear face of said frangible ornamental member whereby said frangible ornamental member may be readily secured to and detached from the exterior surface of the transportable article of furniture.

3. A transportable article of furniture, including in combination: a substantially-flat exterior surface having a clearance-recess therein of less over-all dimensions than the corresponding dimensions of the said exterior surface and provided with a plurality of counter-clearance recesses, said clearance-recess and the counter-clearance recesses being arranged to accommodate fastening-means; a frangible ornamental member corresponding in size substantially to the exterior surface of said article of furniture; and fastening-means arranged to detachably secure said frangible ornamental member substantially flat against the said exterior recessed surface of said transportable article of furniture, said fastening-means comprising a rigid perforated plate cemented permanently to the rear face of said frangible ornamental member and of less over-all dimensions than the corresponding dimensions of said clearance-recess so as to extend therein, tongues projecting rearwardly from the rear face of said rigid perforated plate into corresponding counter-clearance recesses of said exterior surface, and fastening-elements supported so as to extend within the counter-clearance recesses of said exterior surface and arranged to engage and disengage the respective tongues of said rigid perforated plate on the rear face of said frangible ornamental member whereby said frangible ornamental member may be readily secured to and detached from the exterior surface of the transportable article of furniture.

4. A transportable article of furniture, including in combination: a closure-member having a substantially-flat exterior surface provided with a clearance-recess of less over-all dimensions than the corresponding dimensions of the said exterior surface and arranged to accommodate fastening-means; a frangible ornamental member corresponding in size substantially to the size of said closure-members; fastening-means arranged to detachably secure said frangible ornamental member substantially flat against the recessed surface of said closure-member, said fastening-means comprising a rigid perforated plate cemented permanently to the rear face of said frangible ornamental member and of less over-all dimensions than the corresponding dimensions of said clearance-recess so as to extend therein, and a fastening-element supported so as to extend within the clearance-recess of said closure-member and arranged to engage and disengage the said rigid perforated plate on the rear face of the frangible ornamental member whereby said frangible ornamental member may be readily secured to and detached from the closure-member; a closure-member operating-handle; and handle-fastening-means comprising a fastening-element mounted in the said rigid perforated plate on the back side of said frangible ornamental member and arranged to project through said plate and the ornamental frangible member of said closure-member to detachably secure said handle on the front face thereof.

5. A transportable article of furniture, including in combination: a substantially-flat exterior surface having a plurality of clearance-recesses therein each of less over-all dimensions than the corresponding dimensions of the said exterior surface, and each clearance-recess being provided with substantially-diametrically-opposed counter-clearance recesses, said clearance-recesses and counter-clearance recesses being arranged to accommodate fastening-means; a frangible ornamental member corresponding in size substantially to the exterior surface of said article of furniture; and fastening-means arranged to detachably secure said frangible ornamental member substantially flat against the said exterior surface of said transportable article of furniture, said fastening-means comprising a plurality of rigid plates cemented permanently to the rear face of said frangible ornamental member, each plate being of less over-all dimensions than the corresponding dimensions of the respective clearance-recesses so as to extend therein, tongues projecting rearwardly from the respective rear faces of said rigid plates into the corresponding clearance-recesses of said exterior surface, and straps secured at their opposite ends respectively in the diametrically-opposed counter-clearance recesses of said exterior surface and arranged to be engaged and disengaged by the respective tongues of said rigid plates on the rear face of said frangible ornamental member whereby said frangible ornamental member may be readily secured to and detached from the exterior surface of the transportable article of furniture.

LUTHER G. SIMJIAN.

REFERENCES CITED

The following references are of record in the file of this patent:

UNITED STATES PATENTS

| Number | Name | Date |
|---|---|---|
| 1,813,162 | Hoegger | July 7, 1931 |
| 1,883,834 | Turner | Oct. 18, 1932 |
| 1,890,166 | Shatto et al. | Dec. 6, 1932 |
| 1,971,396 | De Waide | Aug. 28, 1934 |
| 2,068,922 | Marchand | Jan. 26, 1937 |
| 2,105,265 | Reilly | Jan. 11, 1938 |
| 2,139,322 | Miner | Dec. 6, 1938 |
| 2,402,717 | Winer | June 25, 1946 |